United States Patent [19]

Schoennahl

[11] Patent Number: 5,212,123
[45] Date of Patent: May 18, 1993

[54] REFRACTORY MATERIALS FORMED FROM REFRACTORY GRAINS BONDED BY A SIALON MATRIX CONTAINING DISPERSED GRAPHITE AND/OR BORON NITRIDE PARTICLES AND A PROCESS FOR THE PREPARATION OF THESE MATERIALS

[75] Inventor: Jacques P. R. Schoennahl, Villeurbanne, France

[73] Assignee: Savoie Refractaires, Venissieurs, France

[21] Appl. No.: 772,978

[22] Filed: Oct. 8, 1991

[30] Foreign Application Priority Data

Oct. 24, 1990 [FR] France .................... 90 13168

[51] Int. Cl.$^5$ ............................................. C04B 35/58
[52] U.S. Cl. ........................................ 501/87; 501/92; 501/96; 501/98; 264/65
[58] Field of Search ............ 501/96, 97, 98, 128; 423/327

[56] References Cited

U.S. PATENT DOCUMENTS

| | | | |
|---|---|---|---|
| 4,243,621 | 1/1981 | Mori et al. | 264/65 |
| 4,533,646 | 8/1985 | Wang et al. | 501/97 |
| 4,557,884 | 12/1985 | Petrak et al. | 264/65 |
| 4,578,363 | 3/1986 | Campos-Loriz | 501/89 |
| 4,608,353 | 8/1986 | Nagayama | 501/97 |
| 4,870,037 | 9/1989 | Hoggard et al. | 501/97 |
| 4,871,698 | 10/1989 | Fishler et al. | 501/97 |
| 4,913,408 | 4/1990 | Hoggard et al. | 266/280 |

FOREIGN PATENT DOCUMENTS

| | | |
|---|---|---|
| 0309225 | 3/1989 | European Pat. Off. |
| 0317980 | 5/1989 | European Pat. Off. |
| 3320016 | 12/1983 | Fed. Rep. of Germany |
| 0242849 | 10/1987 | Fed. Rep. of Germany |
| 58-084914 | 5/1983 | Japan |

Primary Examiner—Mark L. Bell
Assistant Examiner—Alan Wright
Attorney, Agent, or Firm—Stevens, Davis, Miller & Mosher

[57] ABSTRACT

The invention relates to refractory materials having high resistance to corrosion, high mechanical strength at elevated temperature and high resistance to thermal shock, comprising:

(A) grains of at least one refractory material whose melting point or, where appropriate, thermal decomposition temperature is higher than 1700° C., these particles being dispersed in (B) a binding matrix consisting predominantly of a sialon of formula $Si_{6-z}Al_zO_zN_{8-z}$, where z ranges from 0.5 to 4, as determined from an X-ray diffraction pattern, wherein said refractory materials also comprise:

(C) particles of hexagonal boron nitride and/or crystalline graphite dispersed in the binding matrix.

Use in iron and steel metallurgy, in particular as slide closing plates, immersed nozzles, etc.

10 Claims, No Drawings

REFRACTORY MATERIALS FORMED FROM REFRACTORY GRAINS BONDED BY A SIALON MATRIX CONTAINING DISPERSED GRAPHITE AND/OR BORON NITRIDE PARTICLES AND A PROCESS FOR THE PREPARATION OF THESE MATERIALS

The invention relates to novel refractory materials consisting of grains bonded by a sialon matrix containing boron nitride and/or graphite particles dispersed therein and to a process for their production.

Iron and steel metallurgy requires increasingly high-performance and reliable refractory materials: the point at issue, in fact, is simultaneously to improve the corrosion resistance, the mechanical strength at high temperatures and the resistance to thermal shocks.

The applications mainly concerned are:

refractory ceramic parts used in devices for the protection or control of jets of cast iron or steel. Particular examples of such parts are slide shutter plates, jet protection tubes and immersed nozzles, refractory ceramic parts used in mixing devices, which may either be mechanical or which operate by blowing gas, into the molten metal, seating bricks serving as seating and support for devices for blowing in gas and devices for controlling metal jets, and also ladle or distributor impact plates, and the inner lining of blast furnaces and in particular of the bottom of the body, of the shaft, the boshes, the tuyere ring and the hearth.

The wide variety of stresses to which these materials are exposed often results from the discontinuous operation of the equipment: there is a thermal shock at the start and then at the end of a cycle; during a cycle the refractory parts are successively in contact with the metal and then a molten slag. Finally, between two cycles the refractory parts, which remain at a relatively high temperature, are subjected to the oxidizing action of the ambient air.

Purely mechanical stresses are always present: mechanical impacts and stresses resulting from handling, confinement stresses created by an external metal shell and finally, in the case of the jet control systems, stresses associated with the actual function of the refractory parts, that is to say movements and closing effects.

Finally, it will also be noted that in all cases, the refractory parts under consideration are subjected to the erosive action of the molten metal.

The list of properties desired for these refractory materials is thus established as follows:

high mechanical strength at elevated temperature in order to cope either with mechanical stresses or with the effects of erosion by the stream of metal or slag, excellent resistance to chemical corrosion by cast iron and steel;

good resistance to corrosion by iron and steel slags and covering powders;

non-wettability properties in respect of metals and slags, so as to restrict their infiltration into the joins, cracks or pores, but also to reduce the risks of clinging of crusts solidified during cooling operations; good resistance to oxidation by air;

excellent resistance to thermal shocks;

a non-oxidizing character in the presence of aluminum and calcium dissolved in some steels; and tribological properties in respect of the mobile parts.

Despite a complex and corrosive environment, high reliability is demanded of the refractory parts concerned since any accidental destruction could have catastrophic consequences for the installations and for personnel.

Refractory materials having a nitride-containing matrix are renowned for their exceptional mechanical strength at high temperature. The use of materials based on a silicon carbide granulate bonded by a silicon nitride or sialon matrix is widespread as kiln furniture or bricks used for lining a blast furnace or for aluminum metallurgy. EP-A-0,317,980 also discloses refractory materials formed from a granulate based on alumina, bonded by a binder formed from silicon oxynitride and sialon. These materials are also recommended for the production of kiln furniture or for aluminum metallurgy.

However, the use of this type of materials in iron and steel metallurgy and in particular in steel-making is handicapped by an inadequate resistance to thermal shocks and an inadequate resistance to corrosion.

The aim of the present invention is to provide novel refractory materials capable of meeting the above-mentioned demands and also a process for their production.

More particularly, the invention relates to novel refractory materials which comprise:

(A) grains of at least one refractory material whose melting point and thermal decomposition temperature are higher than 1700° C.;

(B) a binding matrix which binds these grains together and predominantly consists of a sialon of the formula $Si_{6-z}Al_zO_zN_{8-z}$, where z ranges from 0.5 to 4, as determined from an X-ray diffraction pattern; and (C) particles of hexagonal boron nitride and/or crystalline graphite flakes dispersed in the binding matrix.

The following may be mentioned as non-limiting examples of refractory materials which can make up the grains (A): corundums, mullite, $MgO-Al_2O_3$ spinel regardless of whether these products are electrocast or sintered; electrocast materials having an alumina content of at least 85% by weight; electrocast or sintered magnesia; electrocast materials of the alumina/silica/zirconia system containing at least 50% of alumina and 5% of zirconia; aluminum oxycarbides of the $Al_4O_4C$ and $Al_2OC$ types, products based on aluminum oxynitride, and silicon carbide. The choice of the type of grains used will depend on the particular application envisaged.

The proportion of grains (A) in the materials of the invention may vary widely depending on the properties desired for the material. By way of illustration, the proportion of grains (A) may range from 31 to 85% by weight approximately. Currently, a proportion of 36 to 68% by weight approximately is preferred.

The binding phase (B) which binds the grains (A) together predominantly consists of sialon of formula $Si_{6-z}Al_zO_zN_{8-z}$, where z ranges from 0.5 to 4 and preferably from 2.5 to 3.5.

The binding matrix will usually also contain, as minor constituent(s), one or more compounds chosen from silicon nitride $Si_3N_4$, silicon oxynitride, nitrogen-containing mullite having the composition $Al_6Si_6N_8O_9$, corundum and the 15R polytype of aluminum nitride, the total of these minor constituents not exceeding about 15% of the binding matrix.

The proportion of binding phase (B) itself may vary widely. By way of illustration, the proportion of binding phase (B) may range from 12 to 45% by weight approximately. Currently, a proportion of 25 to 42% by weight approximately is preferred.

The particles or flakes (C) dispersed in the binding phase may consist of boron nitride, crystalline graphite or a mixture of these. The crystalline graphite is in the form of flakes. The presence of these particles or flakes within the binding phase maybe observed on photomicrographs taken with a scanning electron microscope.

The proportion of (C) may also vary widely. By way of illustration, the proportion of (C) may range from 3 to 42% by weight. Currently, a proportion of 5 to 30% approximately is preferred.

It should be noted that the proportions of the constituents of the materials of the invention are given only by way of illustration and in an approximate manner inasmuch as the determination of these proportions is difficult to carry out with precision in the final material.

The invention also relates to a process for the production of refractory materials according to the invention.

This process comprises (1) preparing a batch comprising a mixture of the following constituents in the indicated proportions:
   a) 33 to 88% by weight, preferably 40 to 75% by weight, of grains at least 90% of which are between 50 μm and 5 mm in size, these grains consisting of a refractory material whose melting point and, where appropriate, thermodecomposition temperature are higher than 1700° C.;
   b) 9 to 40% by weight, preferably 20 to 35%, of a mixture of reactive powders comprising:
      (i) 23 to 90%, preferably 35 to 45%, of silicon powder, at least 90% of the particles of which have a diameter smaller than 150 μm,
      (ii) 9 to 62%, preferably 38 to 50%, of calcined alumina, at least 90% of the particles of which have a diameter smaller than 20 μm, and
      (iii) 0 to 24%, preferably 12 to 20%, of aluminum powder, at least 90% of the particles of which have a diameter smaller than 80 μm, the sum of the constituents (i) to (iii) representing 100% and the ratio of the proportions of aluminum and calcined alumina being less than 0.7,
   c) 3 to 45% by weight, preferably 5 to 33%, of hexagonal boron nitride particles or of crystalline graphite flakes or of a mixture of these, at least 80% of the graphite flakes being greater than 100 μm in size;
   d) 0 to 3% of a dried and ground refractory clay, the sum of the ingredients (a) to (d) making up 100%, and
   (e) a small amount of temporary binder;
(2) shaping the resulting mixture to the desired shape by pressing;
(3) drying the shaped mixture; and
(4) firing the shaped and dried mixture under a nitrogen atmosphere at a temperature of 1300° C. to 1600° C.

To ensure that the preferred sialon binding matrix having formula mentioned where $z=2.5$ to 3.5 is obtained, it was found to be advisable to use a mixture of reactive powders comprising, by weight, (i) 35%–45% of the silicon powder, (ii) 38%–50% of the calcined alumina and (iii) 12%–20% of the aluminum powder.

The shaping carried out in step (2) may be effected by uniaxial or isostatic pressing, in a conventional manner. The role of the clay is that of a pressing additive facilitating shaping.

The drying step (3) may be carried out at a moderately high temperature, for example from 100° to 200° C., preferably about 150° C.

The duration of the firing step (4) may vary widely depending, in particular, on the size of the shaped and dried article. By way of illustration, a holding time of 4 to 10 hours approximately at a temperature of 1300°–1400° C. is usually satisfactory.

It will be noted that there is a difference between the grain, graphite and boron nitride contents in the initial mixture and the proportions of the same constituents in the finished product, since firing is accompanied by nitrogen fixation and thus by an increase in weight.

The grains (a) may consist, for example, of corundum, mullite or $MgO\text{-}Al_2O_3$ spinel, regardless of whether these products are electrocast or sintered, tabular alumina, electrocast materials having an alumina content of at least 85% by weight, electrocast or sintered magnesia, electrocast materials of the alumina/silica/zirconia system containing at least 50% of alumina and 5% of zirconia, aluminum oxycarbides of the $Al_4O_4C$ and $Al_2OC$ type, products based on aluminum oxynitride, or silicon carbide.

The calcined alumina particles (ii) are reactive alumina particles which react with the ingredients (i) and (iii) during the firing step under nitrogen, in order to form the sialon phase.

The crystalline graphite used as ingredient (c) is in the form of large-sized flakes in order to prevent any substantial reaction with the metal powders (formation of carboxynitrides instead of sialon). Furthermore, oxidation resistance is improved with respect to that obtained with other forms of carbon.

The temporary binder (e) may consist of any known temporary binder. Examples which may be mentioned are phenolic resins, furfuryl and polyvinyl alcohols, or aqueous solutions of dextrin or carboxymethyl cellulose, or calcium lignosulfate. By way of illustration, an amount of temporary binder of the order of 2 to 4% by weight approximately, relative to the sum of the ingredients (a) to (d), has usually proved satisfactory.

The invention is illustrated, in a non-limiting manner, by the following examples. In these examples, $220\times110\times60$ mm test bricks were prepared by a process in which the starting constituents were mixed, per 10 kg batch, in a Bonnet mill, shaped into bricks using a hydraulic press exerting a pressure of 1000 bars, dried at 150° C. and then fired under nitrogen, in an industrial electric furnace, at a temperature of 1300° to 1600° C. for 4 to 10 hours, as appropriate.

The properties of the materials were determined by the following tests:

Fluxtural strength at elevated temperature

Measured in air after accelerated heating to limit the oxidation effects.

Resistance to thermal shock

This is expressed by the reduction, in %, in the cold flextural strength measured on $125\times25\times25$ mm bars after the following treatment: sudden introduction of testpieces at ambient temperature into a furnace heated at 1200° C., holding for 30 min followed by quenching of the testpieces in cold water.

Resistance to Corrosion by Steel Cast Iron and Slags

This is determined by the dynamic method known as "rotating fingers". Four testpieces cut in the form of bars are fixed in a circle on a support provided with a rotary movement about a vertical axis corresponding to a linear speed of the testpieces of 2.4 cm/s. At least one of the testpieces serves as reference.

The attacking agent (steel, cast iron or slag) is placed in a refractory crucible and brought to the test temperature. When the test temperature is reached, the support carrying the testpieces is lowered so as to immerse the lower end of the testpieces in the molten metal or slag for a predetermined time. At the end of the test, the support carrying the testpieces is raised so as to extract the testpieces from the molten attacking agent before solidification of the latter. After cooling, the loss in thickness of the testpieces is measured and, if necessary, the corrosion front is examined by microscopy.

In the case of the resistance to corrosion by steel, the attacking agent used was an XC 38 steel at 1700° C. under an argon atmosphere, with a holding time of the testpieces in the molten steel of 4 hours.

Resistance to Corrosion by Covering Powder

Covering powder, which is made up of compounds having a relatively low melting point, is introduced into the ingot molds in order to protect the surface of the cast metal (steel) against oxidation. The parts which are located at the steel/covering powder interface, such as the immersed nozzles, undergo intense and localized corrosion at said interface.

The test to determine the resistance to corrosion by the covering powder is carried out by the rotary fingers method described above with reference to the resistance to corrosion by steel and slags.

Test for Wettability by Molten Metals

This consists in measuring the angle of contact formed between a surface of the refractory metal tested and a drop of molten test metal. The wettability is the lower the larger the angle.

In order to carry out this test, a platelet of refractory material to be tested is prepared by polishing one of its faces. A small cube (5 to 10 mm edges) of the test metal is placed on this face and the whole is placed in an electrical furnace under an argon atmosphere. The temperature is then raised regularly and, starting at the melting point of the metal, the whole is photographed regularly so as to follow the development of the angle of contact as a function of the temperature.

Other Properties

The other properties, such as the density, the porosity, the cold flexural strength etc., were determined by the methods customarily used for refractory products.

In these examples, the following starting materials were used:

silicon carbide sold by Péchiney Electrométallurgie under the name Arbina Cristallisé. This is a material essentially consisting of alpha-SiC and containing on average 98.5% of SiC according to chemical analysis.

Electrocast corundum corresponding to the following analysis in % by weight: $Al_2O_3=96\%$, $TiO_2=3$, $SiO_2=0.6\%$, $Fe_2O_3=0.2\%$, $CaO+MgO+Na_2O+K_2O=0.2\%$.

Commercially available calcined fine alumina assaying at least 99.5% of $Al_2O_3$ and having an average particle size of about 5 μm with 90% of the particles between 1 and 20 μm.

Commercially available silicon powder, sold under the name "Silicium T.140" by Péchiney Electrométallurgie, at least 90% of the particles of which are less than 150 μm in size.

Commercially available aluminum powder, sold under the name "Aluminium 200 TV" by Péchiney which are less than 80 μm in size.

Crystalline natural graphite in the form of flakes, originating from China or Madagascar, having an ash content of less than 17% by weight and at least 80% of the particles of which are greater than 100 μm in size.

Hexagonal boron nitride, sold under the name HCST-A05 by the company Herman C. Starck. This nitride is formed of agglomerates 1 to 10 μm in size consisting of individual platelets about 0.5 to 1 μm in size.

Ground clay, sold under the name "DA.40/42" by Denain Anzin Minéraux, corresponding to the following chemical analysis, in % by weight: $Al_2O_3=36\%$, $SiO_2=47\%$, $Fe_2O_3=1.8\%$, $TiO_2=1.8\%$, $CaO+MgO+Na_2O+K_2O=0.8\%$, loss on ignition: 12.6%.

EXAMPLE 1

7 samples A to G made up of corundum grains with a sialon binder were prepared by the method described above from a starting batch containing, respectively, various proportions of graphite flakes.

Table I below lists the constituents of the starting batch and their proportions in % by weight and various properties of the materials obtained. Sample A is outside the scope of the invention and is given by way of illustration.

TABLE I

| | Sample | | | | | | |
|---|---|---|---|---|---|---|---|
| | A (outside the scope of the invention) | B | C | D | E | F | G |
| Black corundum (2/0.2 mm) | 40 | 40 | 40 | 40 | 40 | 40 | 33 |
| Black corundum (0.2/0.05 mm) | 33 | 28 | 23 | 18 | 8 | 0 | 0 |
| Calcined fine alumina | 10 | 10 | 10 | 10 | 10 | 10 | 8 |
| Aluminum 200 TV | 4 | 4 | 4 | 4 | 4 | 4 | 3 |
| Silicon T.140 | 10 | 10 | 10 | 10 | 10 | 10 | 8 |
| Graphite JPF 80 | 0 | 5 | 10 | 15 | 25 | 33 | 45 |
| Clay DA 40/42 | 3 | 3 | 3 | 3 | 3 | 3 | 3 |
| Powdered dextrin | +0.5 | +0.5 | +0.5 | +0.5 | +0.5 | +0.5 | +0.5 |
| Water | +2 | +2 | +2 | +2 | +2 | +2 | +2 |
| Density | 3.05 | 2.96 | 2.89 | 2.81 | 2.66 | 2.58 | 2.30 |
| Flexural strength at 20° C. (MPa) | 22 | 21 | 18 | 16 | 15 | 10 | 9 |
| Flexural strength at | 31 | 27 | 25 | 16 | 12 | 10 | 8 |

TABLE I-continued

| | Sample | | | | | | |
|---|---|---|---|---|---|---|---|
| | A (outside the scope of the invention) | B | C | D | E | F | G |
| 1500° C. (MPa) | | | | | | | |
| Resistance to thermal shock**: reduction in flexural strength after quenching (%) | −51 | −51 | −47 | −40 | −31 | −15 | −10 |
| Resistance to corrosion by steel at 1700° C., Degree of wear (%) | 0 | 0 | 0 | 0 | 0 | 0 | 0 |
| Thermal stability*** Loss in weight % | −7 | −7.4 | — | −6.2 | — | −7.4 | — |
| Mineralogical analysis: | | | | | | | |
| Sialon % | 30 | 29 | 28 | 28.5 | 29 | 28 | 23 |
| Graphite % | 0 | 3.7 | 7.5 | 11 | 19 | 25 | 34 |
| AlN % | 0 | traces | 2 | 2 | traces | traces | 0 |

*the "+" symbol in front of a percentage indicates that this percentage is calculated relative to 100% of the other constituents.
**after 1 20° C./1200° C./water cycle
***fired at 1750° C./5 h under argon A considerable improvement in the resistance to thermal shock is observed at a graphite content (determined for the final product) higher than 4%.

At very high graphite contents (30 to 35%, sample G), the resistance to thermal shock is close to that of an alumina/graphite product containing resin binder which has the same graphite content and is currently commonly used to produce jet protection tubes and immersed nozzles. The mechanical strength of the product according to the invention at elevated temperature is, however, twice that of the conventional product.

In this series of tests, the thermal stability of the materials was also studied by firing under argon at 1750° C. for 5 hours. It appears that the addition of graphite in no way reduces the thermal stability of the sialon binder.

EXAMPLE 2

Two samples H and I formed of grains of silicon carbide with a sialon binder containing, respectively, 0 and 8% of boron nitride were prepared using the method described above. Table II lists the constituents of the starting batch, their proportions and various properties of the materials obtained. Sample H is outside the scope of the invention and is given by way of illustration.

It appears that the addition of boron nitride permits a further significant improvement in the resistance to thermal shock of these materials, which are already considered highly resistant.

TABLE II

| Sample | H | I |
|---|---|---|
| Silicon carbide 2–0.5 mm | 10 | 10 |
| Silicon carbide 0.5–0.125 mm | 30 | 30 |
| Silicon carbide 0.125–0.05 mm | 23 | 14.5 |
| Calcined fine alumina | 14 | 14 |
| Aluminum 200T | 5 | 5 |
| Silicon T140 | 15 | 15 |
| Boron nitride | 0 | 8.5 |
| Clay DA 40/42 | 3 | 3 |
| Powdered carboxymethyl cellulose | +0.5 | +0.5 |
| Water | +2 | +2 |
| Density | 2.72 | 2.70 |
| Flexural strength at 20° C. (MPa) | 45 | 36 |
| Flexural strength 1500° C. | 45 | 31 |
| Resistance to thermal shock - Reduction in flexural strength after quenching 3 times (%) | −75 | −47 |
| Mineralogical analysis: | | |
| Sialon % | 36.5 | 36 |
| BN % | 0 | 7.5 |
| AlN15R % | traces | traces |
| Corundum % | 3 | 4 |
| Silicon nitride % | 2 | 2 |

*After three 20° C.–1200° C.-water cycles

EXAMPLE 3

A sample J formed of grains of corundum with a sialon binder containing 8% of boron nitride was prepared using the method described above. Table III lists the constituents of the starting batch, their proportions and various properties of the material obtained. The data for sample A are repeated for comparison.

A significant improvement in the resistance to corrosion by covering powder and a spectacular improvement in the properties of non-wettability by steel are observed. This latter property will enable the risks of infiltration of steel between the plates of the slide closing systems and into the crevices in devices for blowing in gas in molten steel baths to be reduced.

TABLE III

| Sample | A | J |
|---|---|---|
| Black corundum 2–0.2 mm | 40 | 40 |
| Black corundum 0.2–0.05 mm | 33 | 24.5 |
| Calcined fine alumina | 10 | 10 |
| Aluminum 200TV | 4 | 4 |
| Silicon T140 | 10 | 10 |
| Boron nitride | 0 | 8.5 |
| Clay DA 40/42 | 3 | 3 |
| Powdered dextrin | +0.5 | +0.5 |
| Water | +2 | +2 |
| Density | 3.05 | 2.85 |
| Flexural strength at 20° C. (MPa) | 22 | 20 |
| Flexural strength 1500° C. (MPa) | 31 | 26 |
| Resistance to thermal shock - Reduction in flexural strength after quenching %* | −51 | −42 |
| Resistance to corrosion at 1550°/3 h by covering powder** Degree of wear % | −65 | −51 |
| Angle of wettability by steel at 1580° C. (degree) | 109 | 153 |

*after 1 20° C.–1200° C.-water cycle
**Composition of the covering powder:
$SiO_2$ = 35%; $Al_2O_3$ = 7%; CaO = 35.4% MgO = 0.2%; $Na_2O$ = 11%; $K_2O$ = 0.5% Fluorine = 8%; Carbon = 2.5%; Fe = 0.4%

Table IV permits comparison of the use characteristics of a corundum material containing mullite binder fired at high temperature, currently used for slide closing plates, with material J.

It demonstrates the advantages of the material according to the invention from the standpoints of mechanical strength at elevated temperature, resistance to thermal shock and non-wettability by steel.

TABLE IV

| Product type | Corundum containing mullite binder | Sample J |
|---|---|---|
| $Al_2O_3$ | 87.5 | 61 |
| $SiO_2$ | 7.5 | 0.5 |
| $ZrO_2$ | 4.5 | — |
| Sialon | — | 29.5 |
| BN | — | 8 |
| Others | 0.5 | 1 |
| Density | 3.15 | 2.85 |
| Flexural strength at 1500° C. (MPa) | 11 | 26 |
| Expansion coefficient ($10^{-6}$ K-1) | 7.1 | 5.5 |
| Resistance to thermal shock - Reduction in flexural strength after quenching %* | −59 | −42 |
| Angle of wettability by steel at 1580° C. (degree) | 116 | 153 |

EXAMPLE 4

A sample made up of grains of electrocast magnesia with a sialon bond (z=3) containing 14% of boron nitride was prepared by the general method described above.

The magnesia used had the following specification, in % by weight: MgO=98.3%, SiO<1%, $B_2O_3$>0.05% with a $CaO/SiO_2$ ratio>2.

Table V below lists the composition of the starting batch, and various properties of the material obtained.

TABLE V

| | | |
|---|---|---|
| Starting batch | Electrocast - magnesia (2−1.25 mm) | 18% by weight |
| | Electrocast - magnesia (1.25−0.5 mm) | 18% by weight |
| | Electrocast - magnesia (0.5−0.1 mm) | 26% by weight |
| | Aluminum 200TV | 3.8% by weight |
| | Silicon T140 | 8.5% by weight |
| | Calcined fine alumina | 10.7% by weight |
| | Boron nitride | 15% by weight |
| | Powdered dextrin | +0.5% by weight |
| | Water | +2% by weight |
| Properties | Density | 2.62 |
| | Flexural strength - at 20° C. (MPa) | 16 |
| | Flexural strength - at 1500° C. (MPa) | 10 |
| | Resistance to thermal shock (%) | −67 |
| Mineralogical analysis | Sialon (z = 3) | 25% by weight |
| | Boron nitride | 14% by weight |
| | Spinel* | ~5% by weight |
| | Magnesia | 59% by weight |

*The formation of spinel results from the surface reaction of the magnesia particles with a portion of the fine alumina The materials according to the invention are therefore useful for all types of applications in the field of steel metallurgy and in particular for the refractory parts used in devices for the protection or control of jets of cast iron or steel and in the devices for blowing in gas into the molten metal.

I claim:

1. A refractory material having high resistance to corrosion, high mechanical strength at elevated temperature and high resistance to thermal shock, comprising:
   (A) 31%−85% by weight of grains of at least one refractory material whose melting point or, where appropriate, thermal decomposition temperature is greater than 1700° C., these particles being dispersed in
   (B) 12%−45% by weight of a binding matrix comprising at least 85% by weight of a sialon of the formula $Si_{6-z}Al_zO_zN_{8-z}$ where z ranges from 0.5 to 4, as determined by an X-ray diffraction pattern, and
   (C) 3%−42% by weight of at least one of the particles of hexagonal boron nitride and flakes of crystalline graphite which are dispersed in the binding matrix.

2. The refractory material as claimed in claim 1, wherein the grains (A) are chosen from corundums, mullite or $MgO-Al_2O_3$ spinel, tabular alumina, electrocast materials having an alumina content of at least 85% by weight, electrocast melted or sintered magnesia, electrocast materials of the alumina/silica/zirconia system containing at least 50% of alumina and 5% of zirconia, aluminum oxycarbides of the $Al_4O_4C$ and $Al_2OC$ types, products based on aluminum oxynitride, and silicon carbide.

3. The refractory material as claimed in claim 1, wherein the grains (A) consist of corundum.

4. The material as claimed in claim 1, which comprises, in % by weight: 36%−68% of (A), 25%−42% of (B) and 5%−30% of (C).

5. A process for the production of a refractory material, which comprises
   (1) preparing a mixture of the following constituents in the indicated proportions:
      a) 33 to 88% by weight of grains, at least 90% of which are between 50 μm and 5 mm in size, these grains consisting of a refractory material whose melting point and, where appropriate, thermodecomposition temperature are higher than 1700° C;
      b) 9 to 40% of a mixture of reactive powders comprising:
         (i) 23 to 90% of silicon powder, at least 90% of the particles of which have a diameter smaller than 150 μm,
         (ii) 9 to 62% of calcined alumina, at least 90% of the particles of which have a diameter smaller than 20 μm, and
         (iii) 0 to 24% of aluminum powder, at least 90% of the particles of which have a diameter smaller than 80 μm, the sum of the constituents (i) to (iii) representing 100% and the ratio of the proportions of aluminum and calcined alumina being less than 0.7,
      c) 3 to 45% by weight of hexagonal boron nitride particles or of crystalline graphite flakes or of a mixture of these, at least 80% of the graphite flakes being greater than 100 μm in size;
      d) 0 to 3% of a dried and ground refractory clay, the sum of the ingredients (a) to (d) making up 100%, and
   (2) shaping the resulting mixture by pressing;
   (3) drying the shaped mixture; and
   (4) firing the shaped and dried mixtured under a nitrogen atmosphere at a temperature of 1300° C. to 1600° C.

6. The process as claimed in claim 5, wherein the constituent (a) is chosen from grains of corundum, mullite or MgO-Al$_2$O$_3$ spinel, these being electrocast or sintered, tabular alumina, electrocast material having an alumina content of at least 85% by weight, electrocast or sintered magnesia, electrocast materials of the alumina/silica/zirconia system containing at least 50% of alumina and 5% of zirconia, aluminum oxycarbides of the Al$_4$O$_4$C and Al$_2$OC type, products based on aluminum oxynitride, and silicon carbide.

7. The process as claimed in claim 5, wherein the constituent (a) is formed of corundum grains.

8. The process as claimed in claim 5, wherein the mixture of reactive powders (b) comprises 35%–45% of (i), 38%–50% of (ii) and 12%–20% of (iii).

9. The process as claimed in claim 5, wherein the starting batch comprises 40%–75% of (a), 20%–35% of (b) and 5%–33% of (c).

10. The refractory according to claim 1, wherein z ranges from 2.5 to 3.5.

* * * * *